United States Patent
Furuta

(10) Patent No.: US 12,033,441 B2
(45) Date of Patent: Jul. 9, 2024

(54) NON-TRANSITORY COMPUTER-READABLE RECORDING MEDIUM, MAP UPDATING METHOD, VEHICLE CONTROL METHOD, AND VEHICLE CONTROL SYSTEM

(71) Applicant: TOYOTA JIDOSHA KABUSHIKI KAISHA, Toyota (JP)

(72) Inventor: Hiroki Furuta, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/864,583

(22) Filed: Jul. 14, 2022

(65) Prior Publication Data
US 2023/0083410 A1    Mar. 16, 2023

(30) Foreign Application Priority Data
Sep. 14, 2021 (JP) .................. 2021-149573

(51) Int. Cl.
*B60G 17/0165* (2006.01)
*G07C 5/02* (2006.01)

(52) U.S. Cl.
CPC ........... *G07C 5/02* (2013.01); *B60G 17/0165* (2013.01); *B60G 2400/252* (2013.01)

(58) Field of Classification Search
CPC .. G01C 21/32; B60G 17/0165; B60G 17/018; B60G 17/015
See application file for complete search history.

(56) References Cited

U.S. PATENT DOCUMENTS

| | | | | |
|---|---|---|---|---|
| 9,662,955 B2* | 5/2017 | Popham | ............ | B60G 17/0165 |
| 10,828,953 B2* | 11/2020 | Anderson | ............... | F16F 9/512 |
| 11,807,063 B2* | 11/2023 | Furuta | ............... | B60G 17/0165 |
| 2016/0180171 A1* | 6/2016 | Kamata | .................. | G06V 20/56 |
| | | | | 382/103 |
| 2018/0154723 A1* | 6/2018 | Anderson | ............. | H02K 11/33 |
| 2021/0080265 A1* | 3/2021 | Zhang | ................ | G01C 21/3837 |
| 2021/0095975 A1* | 4/2021 | Mubarek | .............. | G08G 1/0141 |
| 2022/0161624 A1* | 5/2022 | Hirao | ................... | B60G 17/019 |
| 2022/0379679 A1* | 12/2022 | Eisenmann | ........ | B60G 17/0165 |
| 2023/0077687 A1* | 3/2023 | Furuta | ................ | B60G 17/0182 |
| | | | | 280/5.5 |
| 2023/0204386 A1* | 6/2023 | Kitahara | ............... | G01C 21/32 |
| | | | | 701/450 |

* cited by examiner

*Primary Examiner* — Toan C To
(74) *Attorney, Agent, or Firm* — Dinsmore & Shohl LLP

(57) ABSTRACT

Map data regarding a vertical motion parameter related to a vertical motion of a wheel of a vehicle are provided. The map data have a data structure for a specific area. The data structure for the specific area includes at least one of: first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter.

8 Claims, 17 Drawing Sheets

<FIRST LAYER MAP DATA 200-1>

| LAYER 1 | | |
|---|---|---|
| POSITION (X, Y) | FIRST VEHICLE RAVELING DIRECTION ($\varphi\_1$) | UNSPRUNG DISPLACEMENT (Zu) |
| X_1a, Y_1a | $\varphi\_1a$ | Zu_1a |
| X_1b, Y_1b | $\varphi\_1b$ | Zu_1b |
| X_1c, Y_1c | $\varphi\_1c$ | Zu_1c |
| ⋮ | ⋮ | ⋮ |

<SECOND LAYER MAP DATA 200-2>

| LAYER 2 | | |
|---|---|---|
| POSITION (X, Y) | SECOND VEHICLE TRAVELING DIRECTION ($\varphi\_2$) | UNSPRUNG DISPLACEMENT (Zu) |
| X_2a, Y_2a | $\varphi\_2a$ | Zu_2a |
| X_2b, Y_2b | $\varphi\_2b$ | Zu_2b |
| X_2c, Y_2c | $\varphi\_2c$ | Zu_2c |
| ⋮ | ⋮ | ⋮ |

<FIRST LAYER MAP DATA 200-1>

| Layer 1 | | |
|---|---|---|
| POSITION (X, Y) | RANGE OF FIRST VEHICLE TRAVELING DIRECTION ($\varphi\_1$) | UNSPRUNG DISPLACEMENT (Zu) |
| X_1a, Y_1a | RNG1 | Zu_1a |
| X_1b, Y_1b | | Zu_1b |
| X_1c, Y_1c | | Zu_1c |
| ⋮ | | ⋮ |

<SECOND LAYER MAP DATA 200-2>

| Layer 2 | | |
|---|---|---|
| POSITION (X, Y) | RANGE OF SECOND VEHICLE TRAVELING DIRECTION ($\varphi\_2$) | UNSPRUNG DISPLACEMENT (Zu) |
| X_2a, Y_2a | RNG2 | Zu_2a |
| X_2b, Y_2b | | Zu_2b |
| X_2c, Y_2c | | Zu_2c |
| ⋮ | | ⋮ |

UNSPRUNG DISPLACEMENT MAP

<LAYER MAP DATA 200-0>

| POSITION (X, Y) | VEHICLE TRAVELING DIRECTION ($\varphi$) | UNSPRUNG DISPLACEMENT ($Z_u$) |
|---|---|---|
| $X\_a, Y\_a$ | $\varphi\_a$ | $Z_u\_a$ |
| $X\_b, Y\_b$ | $\varphi\_b$ | $Z_u\_b$ |
| $X\_c, Y\_c$ | $\varphi\_c$ | $Z_u\_c$ |
| ⋮ | ⋮ | ⋮ |

*FIG. 14*

‹SECOND LAYER MAP DATA 200-2›

| LAYER 2 | | |
|---|---|---|
| POSITION (X, Y) | RANGE OF SECOND VEHICLE TRAVELING DIRECTION ($\varphi\_2$) | UNSPRUNG DISPLACEMENT (Zu) |
| X_2a, Y_2a | RNG2 | Zu_2a |
| X_2b, Y_2b | | Zu_2b |
| X_2c, Y_2c | | Zu_2c |
| ⋮ | ⋮ | ⋮ |

*FIG. 17*

NON-TRANSITORY COMPUTER-READABLE RECORDING MEDIUM, MAP UPDATING METHOD, VEHICLE CONTROL METHOD, AND VEHICLE CONTROL SYSTEM

CROSS-REFERENCE TO RELATED APPLICATION

This application claims priority to Japanese Patent Application No. 2021-149573 filed on Sep. 14, 2021, the entire contents of which are incorporated by reference herein.

BACKGROUND

Technical Field

The present disclosure relates to map data regarding a parameter related to a vertical motion of a wheel of a vehicle. The present disclosure also relates to generation and update of the map data. Further, the present disclosure relates to vehicle control utilizing the map data.

Background Art

Patent Literature 1 discloses a road surface displacement map that indicates a correspondence relationship between a road surface displacement (road surface unevenness) and a position. By utilizing such the road surface displacement map, vibration suppression control is performed. More specifically, a road surface displacement at a predetermined position ahead of a vehicle is recognized in advance based on the road surface displacement map. A control amount of an active suspension is calculated in advance according to the road surface displacement recognized in advance. Then, the active suspension is controlled at a timing when a wheel passes the predetermined position, and thus the vibration of the vehicle is effectively suppressed.

LIST OF RELATED ART

Patent Literature 1: U.S. Patent Application Publication No. 2018/0154723 (Specification)

SUMMARY

Consider map data regarding a vertical motion parameter related to a vertical motion of a wheel of a vehicle. Even when the wheel passes a same position on a road, the vertical motion parameter to be calculated may be different depending on a vehicle traveling direction. For example, when there is a rut (track) on the road, the vertical motion parameter to be calculated may be different depending on whether the wheel moves along the rut or the wheel crosses the rut. In Patent Literature 1 described above, such the influence of the vehicle traveling direction is not considered. If the vehicle control is performed by using the map data in which the influence of the vehicle traveling direction is not considered, an effect of the vehicle control may not be obtained as expected.

An object of the present disclosure is to provide map data regarding a parameter related to a vertical motion of a wheel of a vehicle, in which a vehicle traveling direction is taken into consideration.

Another object of the present disclosure is to provide a technique that can appropriately perform vehicle control utilizing map data regarding a parameter related to a vertical motion of a wheel of a vehicle in consideration of a vehicle traveling direction.

A first aspect is directed to map data regarding a vertical motion parameter related to a vertical motion of a wheel of a vehicle.

The map data have a data structure for a specific area.

The data structure for the specific area includes at least one of:
  first layer map data indicating a correspondence relationship between a first vehicle traveling direction included in a first direction range, a position, and the vertical motion parameter; and
  second layer map data indicating a correspondence relationship between a second vehicle traveling direction included in a second direction range not overlapping the first direction range, a position, and the vertical motion parameter.

A second aspect is directed to a map updating method for updating map data regarding a vertical motion parameter related to a vertical motion of a wheel of a vehicle.

The map updating method includes updating the map data based on time-series data of a wheel position and time-series data of the vertical motion parameter.

The map data have a data structure for a specific area.

The data structure for the specific area includes at least one of:
  first layer map data indicating a correspondence relationship between a first vehicle traveling direction included in a first direction range, a position, and the vertical motion parameter; and
  second layer map data indicating a correspondence relationship between a second vehicle traveling direction included in a second direction range not overlapping the first direction range, a position, and the vertical motion parameter.

The updating the map data includes:
  acquiring a vehicle traveling direction at a time when the time-series data of the wheel position are acquired;
  determining whether or not layer map data corresponding to the vehicle traveling direction exist in the map data; and
  when the layer map data corresponding to the vehicle traveling direction exist, selecting and updating the layer map data corresponding to the vehicle traveling direction.

A third aspect is directed to a vehicle control method.

The vehicle control method includes:
  acquiring map data regarding a vertical motion parameter related to a vertical motion of a wheel of a vehicle; and
  controlling a target vehicle based on the vertical motion parameter acquired from the map data.

The map data have a data structure for a specific area.

The data structure for the specific area includes at least one of:
  first layer map data indicating a correspondence relationship between a first vehicle traveling direction included in a first direction range, a position, and the vertical motion parameter; and
  second layer map data indicating a correspondence relationship between a second vehicle traveling direction included in a second direction range not overlapping the first direction range, a position, and the vertical motion parameter.

The controlling the target vehicle in the specific area includes:

determining whether or not layer map data corresponding to a vehicle traveling direction of the target vehicle exist in the map data; and when the layer map data corresponding to the vehicle traveling direction of the target vehicle exist, acquiring the vertical motion parameter from the layer map data corresponding to the vehicle traveling direction of the target vehicle.

A fourth aspect is directed to a vehicle control system.

The vehicle control system includes one or more processors.

The one or more processors are configured to execute:

acquiring map data regarding a vertical motion parameter related to a vertical motion of a wheel of a vehicle; and controlling a target vehicle based on the vertical motion parameter acquired from the map data.

The map data have a data structure for a specific area.

The data structure for the specific area includes at least one of:

first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter.

The controlling the target vehicle in the specific area includes:

determining whether or not layer map data corresponding to a vehicle traveling direction of the target vehicle exist in the map data; and when the layer map data corresponding to the vehicle traveling direction of the target vehicle exist, acquiring the vertical motion parameter from the layer map data corresponding to the vehicle traveling direction of the target vehicle.

According to the first and second aspects, the map data regarding the parameter related to the vertical motion of the wheel of the vehicle is provided. The vehicle traveling direction also is considered in the map data.

According to the third and fourth aspects, it is possible to appropriately perform the vehicle control utilizing the map data regarding the parameter related to the vertical motion of the wheel of the vehicle in consideration of a vehicle traveling direction.

BRIEF DESCRIPTION OF DRAWINGS

FIG. 12 is a conceptual diagram for explaining an example of an unsprung displacement map regarding a specific area;

FIG. 13 is a conceptual diagram for explaining another example of an unsprung displacement map regarding a specific area;

FIG. 14 is a conceptual diagram for explaining an example of an unsprung displacement map regarding an area other than a specific area;

FIG. 17 is a conceptual diagram for explaining a modification example of an unsprung displacement map regarding a specific area.

EMBODIMENTS

Embodiments of the present disclosure will be described below with reference to the attached drawings.

1. Suspension and Vertical Motion Parameter

Figure 1:
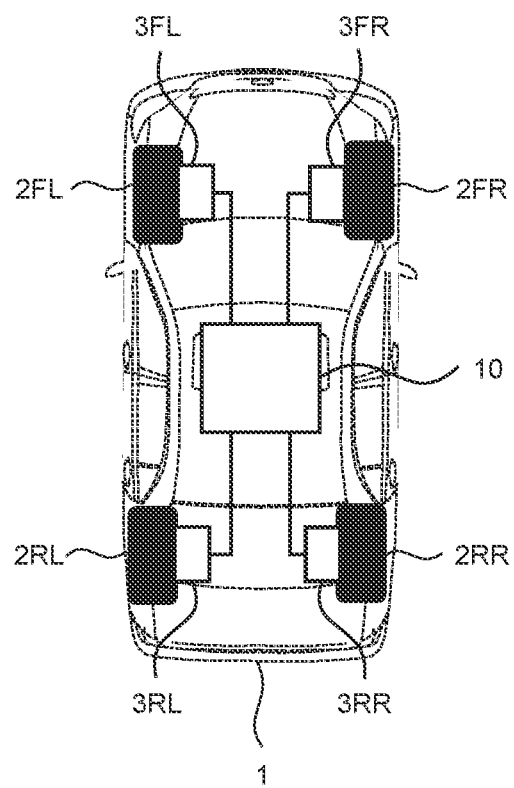
FIG. 1 is a schematic diagram showing a configuration example of a vehicle according to an embodiment.

FIG. 1 is a schematic diagram showing a configuration example of a vehicle 1 according to the present embodiment. The vehicle 1 is provided with wheels 2 and suspensions 3. The wheels 2 include a left front wheel 2FL, a right front wheel 2FR, a left rear wheel 2RL, and a right rear wheel 2RR. Suspensions 3FL, 3FR, 3RL, and 3RR are provided for the left front wheel 2FL, the right front wheel 2FR, the left rear wheel 2RL, and the right rear wheel 2RR, respectively. In the following description, each wheel is referred to as a wheel 2 and each suspension is referred to as a suspension 3, if there is no particular need to distinguish from each other.

Figure 2:
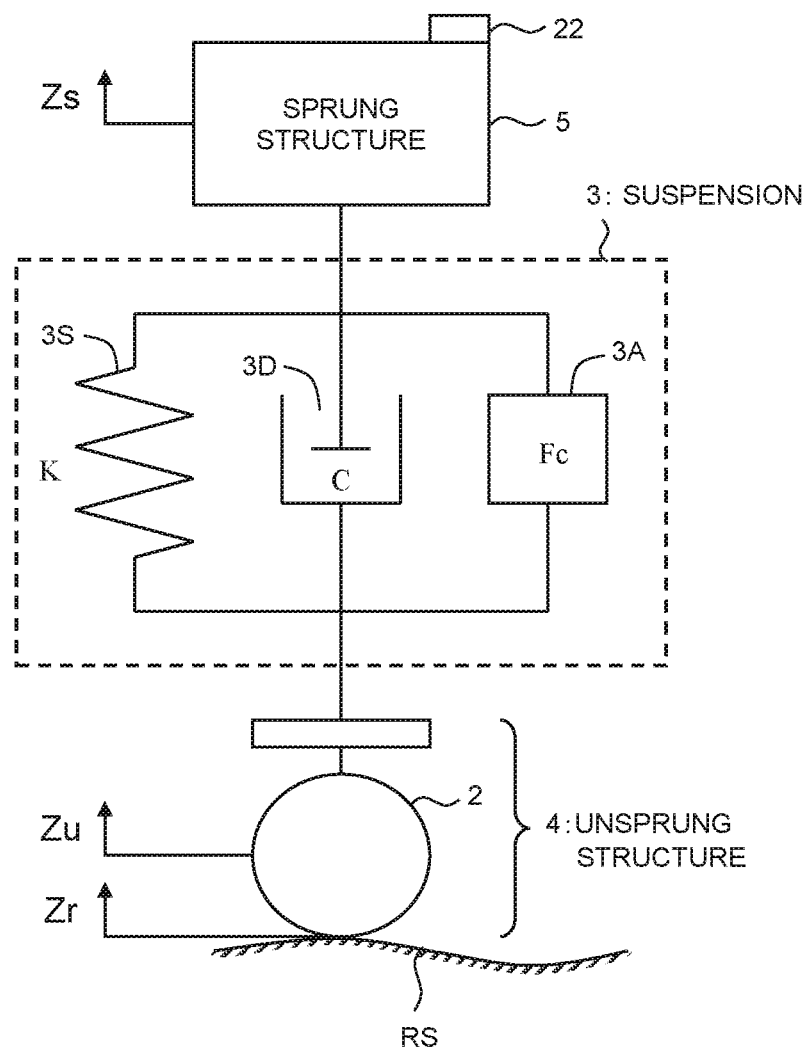
FIG. 2 is a conceptual diagram showing a configuration example of a suspension according to an embodiment.

FIG. 2 is a conceptual diagram showing a configuration example of the suspension 3. The suspension 3 is provided so as to connect between an unsprung structure 4 and a sprung structure 5 of the vehicle 1. The unsprung structure 4 includes the wheel 2. The suspension 3 includes a spring 3S, a damper (shock absorber) 3D, and an actuator 3A. The spring 3S, the damper 3D, and the actuator 3A are provided in parallel between the unsprung structure 4 and the sprung structure 5. A spring constant of the spring 3S is K. A damping coefficient of the damper 3D is C. A damping force of the damper 3D may be variable. The actuator 3A applies a control force Fc in a vertical direction between the unsprung structure 4 and the sprung structure 5.

Here, terms are defined. A road surface displacement Zr is a displacement of a road surface RS in the vertical direction. An unsprung displacement Zu is a displacement of the unsprung structure 4 in the vertical direction. A sprung displacement Zs is a displacement of the sprung structure 5 in the vertical direction. An unsprung velocity Zu' is a velocity of the unsprung structure 4 in the vertical direction. A sprung velocity Zs' is a velocity of the sprung structure 5 in the vertical direction. An unsprung acceleration Zu" is an acceleration of the unsprung structure 4 in the vertical direction. A sprung acceleration $Zs''$ is an acceleration of the sprung structure 5 in the vertical direction. It should be noted that a sign of each parameter is positive in a case of upward and is negative in a case of downward.

The wheel 2 moves on the road surface RS. In the following description, a parameter related to a vertical motion of the wheel 2 is referred to as a "vertical motion parameter." Examples of the vertical motion parameter include the road surface displacement Zr, the unsprung displacement Zu, the unsprung velocity $Zu'$, the unsprung acceleration $Zu''$, the sprung displacement Zs, the sprung velocity $Zs'$, the sprung acceleration $Zs''$ described above, and the like. It can also be said that the vertical motion parameter is a "road surface displacement related parameter" that is related to the road surface displacement Zr.

As an example, in the following description, a case where the vertical motion parameter is the unsprung displacement Zu will be considered. When generalizing, the "unsprung displacement" in the following description shall be replaced by the "vertical motion parameter."

Figure 3:
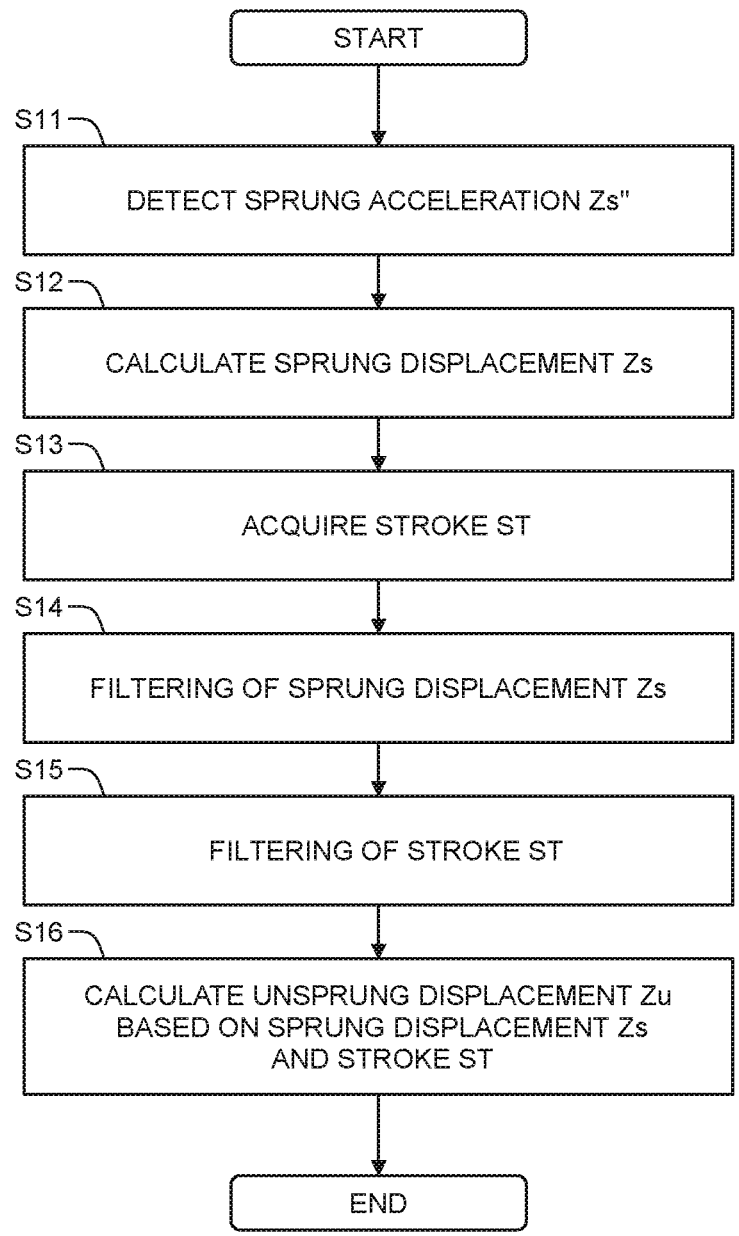
FIG. 3 is a flow chart showing an example of an unsprung displacement calculation process according to an embodiment.

FIG. 3 is a flow chart showing an example of an unsprung displacement calculation process.

In Step S11, the sprung acceleration $Zs''$ is detected by a sprung acceleration sensor 22 installed on the sprung structure 5. In Step S12, the sprung displacement Zs is calculated by double-integrating the sprung acceleration $Zs''$.

In Step S13, a stroke ST (=Zs−Zu) which is a relative displacement between the sprung structure 5 and the unsprung structure 4 is acquired. For example, the stroke ST is detected by a stroke sensor installed on the suspension 3. As another example, the stroke ST may be estimated based on the sprung acceleration $Zs''$ by an observer constructed based on a single-wheel two-degree-of-freedom model.

In Step S14, a filtering process is performed on time-series data of the sprung displacement Zs in order to suppress an influence of a sensor drift and the like. Similarly, in Step S15, a filtering process is performed on time-series data of the stroke ST. For example, the filter is a bandpass filter that passes a signal component of a specific frequency range. The specific frequency range may be set to include an sprung resonance frequency of the vehicle 1. For example, the specific frequency range is from 0.3 Hz to 10 Hz.

In Step S16, a difference between the sprung displacement Zs and the stroke ST is calculated as the unsprung displacement Zu.

Instead of Steps S14 and S15, a filtering process may be performed on time-series data of the unsprung displacement Zu calculated in Step S16.

As yet another example, the unsprung acceleration $Zu''$ may be detected by an unsprung acceleration sensor and the unsprung displacement Zu may be calculated from the unsprung acceleration $Zu''$.

2. Vehicle Control System

2-1. Configuration Example

Figure 4:
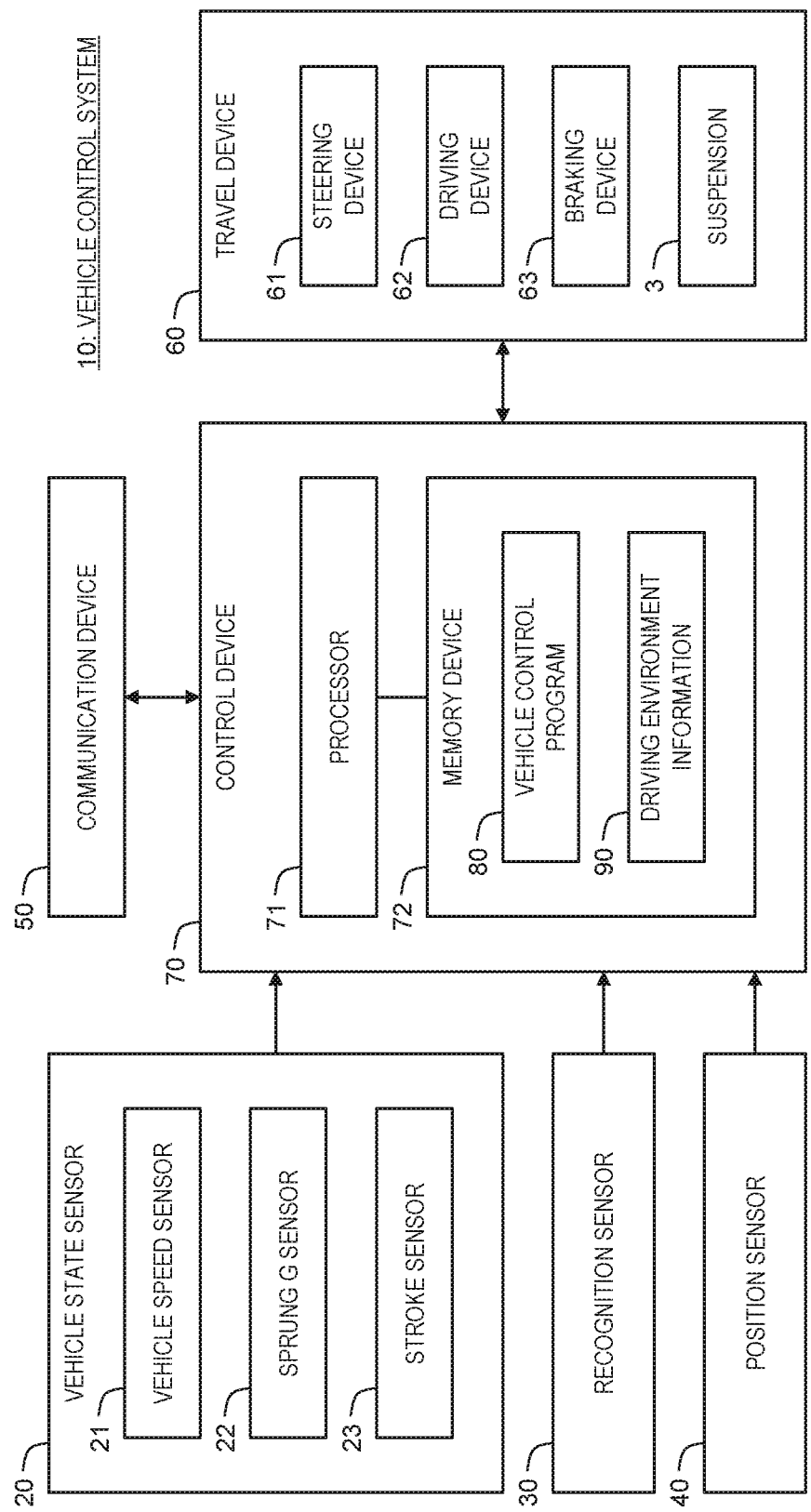
FIG. 4 is a block diagram showing a configuration example of a vehicle control system according to an embodiment.

FIG. 4 is a block diagram showing a configuration example of a vehicle control system 10 according to the present embodiment. The vehicle control system 10 is installed on the vehicle 1 and controls the vehicle 1. The vehicle control system 10 includes a vehicle state sensor 20, a recognition sensor 30, a position sensor 40, a communication device 50, a travel device 60, and a control device 70.

The vehicle state sensor 20 detects a state of the vehicle 1. The vehicle state sensor 20 includes a vehicle speed sensor (wheel speed sensor) 21 that detects a vehicle speed V of the vehicle 1, a sprung acceleration sensor 22 that detects the sprung acceleration $Zs''$, and the like. The vehicle state sensor 20 may include a stroke sensor 23 that detects the stroke ST. The vehicle state sensor 20 may include an unsprung acceleration sensor. In addition, the vehicle state sensor 20 includes a lateral acceleration sensor, a yaw rate sensor, a steering angle sensor, and the like.

The recognition sensor 30 recognizes (detects) a situation around the vehicle 1. Examples of the recognition sensor 30 include a camera, a LIDAR (Laser Imaging Detection and Ranging), a radar, and the like.

The position sensor 40 detects a position and an orientation of the vehicle 1. For example, the position sensor 40 includes a GNSS (Global Navigation Satellite System).

The communication device 50 communicates with the outside of the vehicle 1.

The travel device 60 includes a steering device 61, a driving device 62, a braking device 63, and the suspension 3 (see FIG. 2). The steering device 61 steers the wheel 2. For example, the steering device 61 includes an electric power steering (EPS) device. The driving device 62 is a power source for generating a driving force. Examples of the driving device 62 include an engine, an electric motor, an in-wheel motor, and the like. The braking device 63 generates a braking force.

The control device (controller) 70 is a computer that controls the vehicle 1. The control device 70 includes one or more processors 71 (hereinafter simply referred to as a processor 71) and one or more memory devices 72 (hereinafter simply referred to as a memory devices 72). The processor 71 executes a variety of processing. For example, the processor 71 includes a CPU (Central Processing Unit). The memory device 72 stores a variety of information necessary for the processing by the processor 71. Examples of the memory device 72 include a volatile memory, a non-volatile memory, an HDD (Hard Disk Drive), an SSD (Solid State Drive), and the like. The control device 70 may include one or more ECUs (Electronic Control Units).

A vehicle control program 80 is a computer program for controlling the vehicle 1 and is executed by the processor 71. The vehicle control program 80 is stored in the memory device 72. Alternatively, the vehicle control program 80 may be recorded on a non-transitory computer-readable recording medium. Functions of the control device 70 are implemented by the processor 71 executing the vehicle control program 80.

2-2. Driving Environment Information

Figure 5:
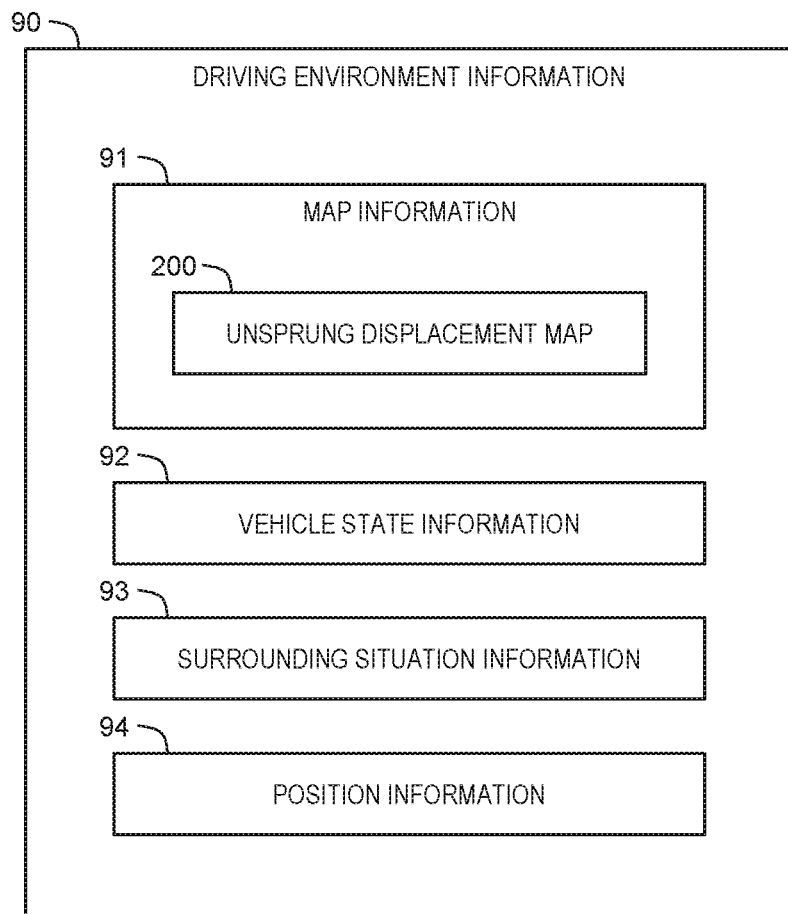
FIG. 5 is a block diagram showing an example of driving environment information according to an embodiment.

FIG. 5 is a block diagram showing an example of driving environment information 90 indicating a driving environment for the vehicle 1. The driving environment information 90 is stored in the memory device 72. The driving environment information 90 includes map information 91, vehicle state information 92, surrounding situation information 93, and position information 94.

The map information 91 includes a general navigation map. The map information 91 may indicate a lane configuration, a road shape, and the like. The map information 91 may include position information of white lines, traffic lights, signs, landmarks, and the like. The map information 91 is obtained from a map database. It should be noted that the map database may be installed on the vehicle 1 or may be stored in an external management server. In the latter case, the control device 70 communicates with the management server to acquire necessary map information 91.

The map information 91 further includes an "unsprung displacement map 200." Details of the unsprung displacement map 200 will be described later.

The vehicle state information 92 is information indicating the state of the vehicle 1. The control device 70 acquires the vehicle state information 92 from the vehicle state sensor 20. For example, the vehicle state information 92 includes the vehicle speed V, the sprung acceleration Zs", the stroke ST, the lateral acceleration, the yaw rate, the steering angle, and the like. The vehicle speed V may be calculated from the vehicle position detected by the position sensor 40. The control device 70 may calculate the unsprung displacement Zu by the method shown in FIG. 3. In that case, the vehicle state information 92 also includes the unsprung displacement Zu calculated by the control device 70.

The surrounding situation information 93 is information indicating the situation around the vehicle 1. The control device 70 recognizes the situation around the vehicle 1 by using the recognition sensor 30 to acquire the surrounding situation information 93. For example, the surrounding situation information 93 includes image information captured by the camera. As another example, the surrounding situation information 93 includes point cloud information obtained by the LIDAR.

The surrounding situation information 93 further includes "object information" regarding an object around the vehicle 1. Examples of the object include a pedestrian, a bicycle, another vehicle (e.g., a preceding vehicle, a parked vehicle, and the like), a road structure (e.g., a white line, a curb, a guardrail, a wall, a median strip, a roadside structure, and the like), a sign, a pole, an obstacle, and the like. The object information indicates a relative position and a relative velocity of the object relative to the vehicle 1. For example, analyzing the image information captured by the camera makes it possible to identify an object and calculate the relative position of the object. It is also possible to identify an object and acquire the relative position and the relative velocity of the object based on the point cloud information obtained by the LIDAR.

The position information 94 is information indicating the position and the orientation (vehicle traveling direction) of the vehicle 1. The control device 70 acquires the position information 94 from a result of measurement by the position sensor 40 such as a GNSS. As another example, the control device 70 may acquire the position information 94 by dead reckoning. As still another example, the control device 70 may acquire high-precision position information 94 by a well-known localization process utilizing the object information and the map information 91.

2-3. Vehicle Control

The control device 70 executes vehicle travel control that controls travel of the vehicle 1. The vehicle travel control includes steering control, driving control, and braking control. The control device 70 executes the vehicle travel control by controlling the travel device 60 (i.e., the steering device 61, the driving device 62, and the braking device 63). The control device 70 may execute driving assist control that assists driving of the vehicle 1 based on the driving environment information 90. Examples of the driving assistance control include lane keeping control, collision avoidance control, autonomous driving control, and the like.

Furthermore, the control device 70 controls the suspension 3. Typically, the control device 70 controls the suspension 3 to perform vibration suppression control that suppresses vibration of the vehicle 1. For example, the control device 70 controls the actuator 3A to generate the control force Fc in the vertical direction between the unsprung structure 4 and the sprung structure 5 (see FIG. 2). As another example, the control device 70 may variably control the damping force of the damper 3D. The vibration suppression control includes "preview control" which will be described later.

3. Map Management System 3-1. Configuration Example

Figure 6:
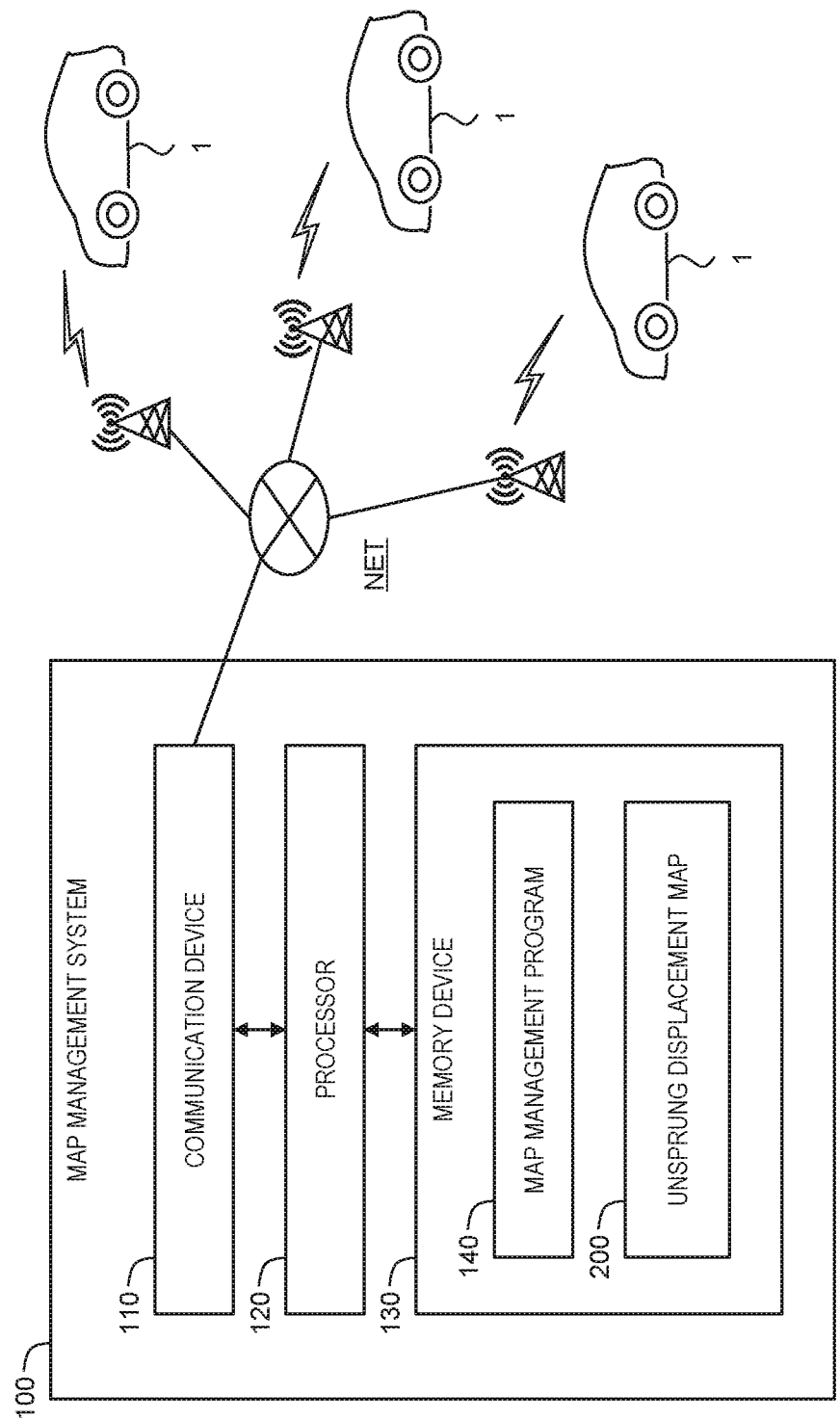
FIG. 6 is a block diagram showing a configuration example of a map management system according to an embodiment.

FIG. 6 is a block diagram showing a configuration example of a map management system 100 according to the present embodiment. The map management system 100 is a computer that manages a variety of map information. Managing the map information includes generating, updating, providing, distributing the map information, and the like. Typically, the map management system 100 is a management server on cloud. The map management system 100 may be a distributed system in which a plurality of servers perform distributed processing.

The map management system 100 includes a communication device 110. The communication device 110 is connected to a communication network NET. For example, the communication device 110 communicates with a lot of vehicles 1 via the communication network NET.

The map management system 100 further includes one or more processors 120 (hereinafter simply referred to as a processor 120) and one or more memory devices 130 (hereinafter simply referred to as a memory device 130). The processor 120 executes a variety of information processing. For example, the processor 120 includes a CPU. The memory device 130 stores a variety of map information. In addition, the memory device 130 stores a variety of information necessary for the processing by the processor 120. Examples of the memory device 130 include a volatile memory, a non-volatile memory, an HDD, an SSD, and the like. The map information may be recorded on a non-transitory computer-readable recording medium.

A map management program 140 is a computer program for the map management and is executed by the processor 120. The map management program 140 is stored in the memory device 130. Alternatively, the map management program 140 may be recorded on a non-transitory computer-readable recording medium. Functions of the map management system 100 are implemented by the processor 120 executing the map management program 140.

The processor 120 communicates with the vehicle control system 10 of the vehicle 1 via the communication device 110. The processor 120 collects a variety of information from the vehicle control system 10, and generates and updates the map information based on the collected information. Moreover, the processor 120 distributes the map information to the vehicle control system 10. Furthermore, the processor 120 provides the map information in response to a request from the vehicle control system 10.

3-2. Unsprung Displacement Map

One of the map information managed by the map management system 100 is the "unsprung displacement map (vertical motion parameter map) 200." The unsprung displacement map 200 is a map regarding the unsprung displacement Zu (vertical motion parameter). The unsprung displacement map 200 is stored in the memory device 130.

The unsprung displacement map 200 may be recorded on a non-transitory computer-readable recording medium.

Figure 7:
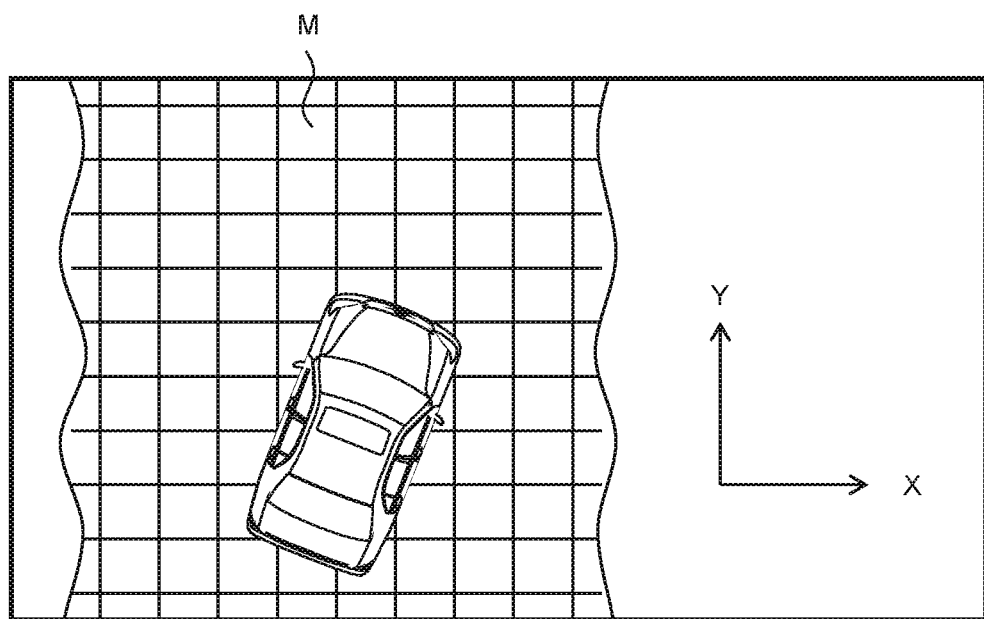
FIG. 7 is a conceptual diagram for explaining an unsprung displacement map according to an embodiment.

FIG. 7 is a conceptual diagram for explaining the unsprung displacement map 200. An XY plane represents a horizontal plane. For example, an absolute coordinate system in the horizontal plane is defined by a latitude direction and a longitude direction, and a position is defined by a latitude and a longitude. The unsprung displacement map 200 indicates at least a correspondence relationship between the position (X, Y) and the unsprung displacement Zu. In other words, the unsprung displacement map 200 expresses the unsprung displacement Zu as a function of at least the position (X, Y). It should be noted that the unsprung displacement map 200 considering a vehicle traveling direction will be described in detail later.

A road area may be segmented in a mesh pattern on the horizontal plane. That is, the road area may be segmented into a plurality of unit areas M on the horizontal plane. A unit area M is, for example, a square. The square has a side length of, for example, 10 cm. The unsprung displacement map 200 indicates a correspondence relationship between the position of the unit area M and the unsprung displacement Zu. The position of the unit area M may be defined by a representative position (e.g., a center position) of the unit area M, or may be defined by a range (a latitude range and a longitude range) of the unit area M. The unsprung displacement Zu of the unit area M is, for example, an average value of the unsprung displacements Zu acquired within the unit area M. The smaller the unit area M is, the higher a resolution of the unsprung displacement map 200 is.

3-3. Map Generating/Updating Process

The processor 120 collects information from a lot of vehicles 1 via the communication device 110. The processor 120 then generates and updates the unsprung displacement map 200 based on the information collected from the lot of vehicles 1. Hereinafter, an example of the map generating/updating process will be described in more detail.

The position in the unsprung displacement map 200 is a position through which the wheel 2 has passed. The position of each wheel 2 is calculated based on the position information 94 described above. More specifically, a relative positional relationship between a reference point of the vehicle position in the vehicle 1 and each wheel 2 is known information. Based on the relative positional relationship and the vehicle position indicated by the position information 94, it is possible to calculate the position of each wheel 2.

The unsprung displacement Zu is calculated by the method as shown in FIG. 3. That is, the sprung displacement Zs and the stroke ST are acquired by the use of the vehicle state sensor 20 installed on the vehicle 1. The sprung displacement Zs and the stroke ST are referred to as "sensor-based information" for convenience sake. The unsprung displacement Zu is calculated based on the sensor-based information.

For example, while the vehicle 1 is traveling, the control device 70 of the vehicle control system 10 calculates the unsprung displacement Zu in real time based on the sensor-based information. Further, the control device 70 associates the wheel position with the unsprung displacement Zu of the same timing. Then, the control device 70 transmits a set of time-series data of the wheel position and time-series data of the unsprung displacement Zu to the map management system 100. The processor 120 of the map management system 100 generates and updates the unsprung displacement map 200 based on the time-series data of the wheel position and the time-series data of the unsprung displacement Zu.

As another example, the control device 70 of the vehicle control system 10 associates the wheel position with the sensor-based information of the same timing. Then, the control device 70 transmits a set of time-series data of the wheel positions and time-series data of the sensor-based information to the map management system 100. The processor 120 of the map management system 100 calculates the unsprung displacement Zu based on the received sensor-based information. Further, the processor 120 generates and updates the unsprung displacement map 200 based on the time-series data of the wheel position and the time-series data of the unsprung displacement Zu.

It should be noted that when the unsprung displacement Zu is calculated in the map management system 100, it is possible to perform the filtering process by utilizing a zero-phase filter, because there is no constraint of the processing time. Utilizing the zero-phase filter makes it possible to prevent a "phase shift."

Figure 8:
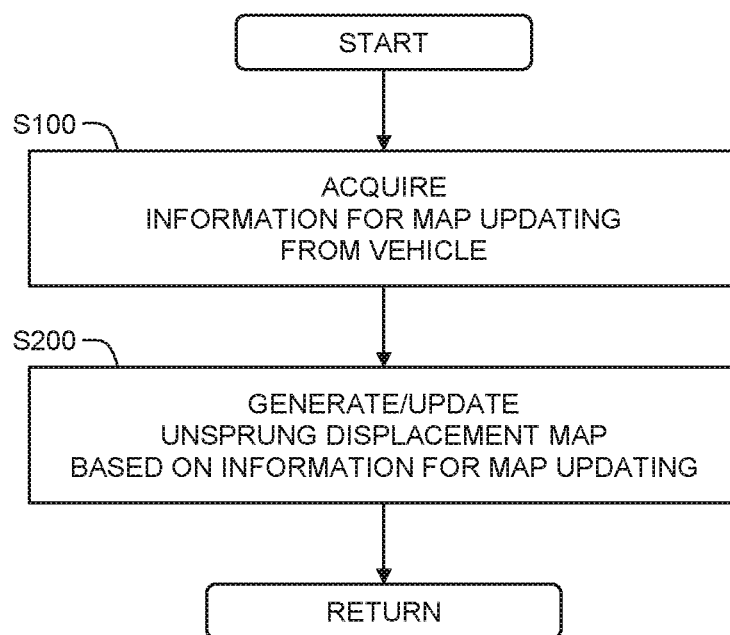
FIG. 8 is a flow chart summarizing a map generating/updating process according to an embodiment.

FIG. 8 is a flow chart summarizing the map generating/updating process according to the present embodiment.

In Step S100, the processor 120 of the map management system 100 acquires "information for map updating" from the vehicle 1 (i.e., the vehicle control system 10) via the communication device 110. The information for map updating includes the time-series data of the position (the wheel position) of the vehicle 1. In addition, the information for map updating includes the time-series data of the sensor-based information (e.g., the sprung displacement Zs, the stroke ST) necessary for calculating the unsprung displacement Zu. Alternatively, the information for map updating may include the time-series data of the unsprung displacement Zu calculated by the control device 70 of the vehicle control system 10.

In Step S200, the processor 120 of the map management system 100 generates/updates the unsprung displacement map 200 based on the information for map updating.

3-4. Modification Example

The vehicle control system 10 of the vehicle 1 may hold a database of the unsprung displacement map 200 and generate/update its own unsprung displacement map 200. That is to say, the map management system 100 may be included in the vehicle control system 10.

4. Preview Control Utilizing Unsprung Displacement Map

The control device 70 of the vehicle control system 10 communicates with the map management system 100 via the communication device 50. The control device 70 acquires the unsprung displacement map 200 of an area including a current position of the vehicle 1 from the map management system 100. The unsprung displacement map 200 is stored in the memory device 72. Then, based on the unsprung displacement map 200, the control device 70 executes "preview control" which is a kind of the vibration suppression control.

Figure 9:
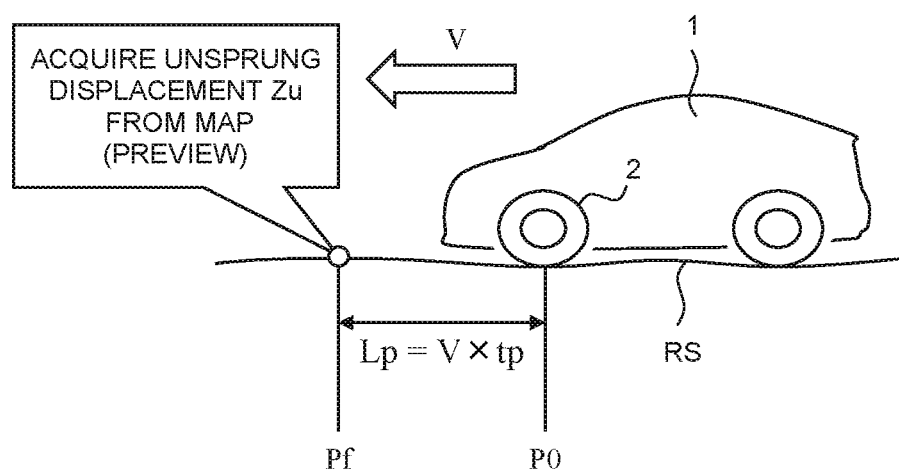
FIG. 9 is a conceptual diagram for explaining preview control utilizing an unsprung displacement map according to an embodiment.
Figure 10:
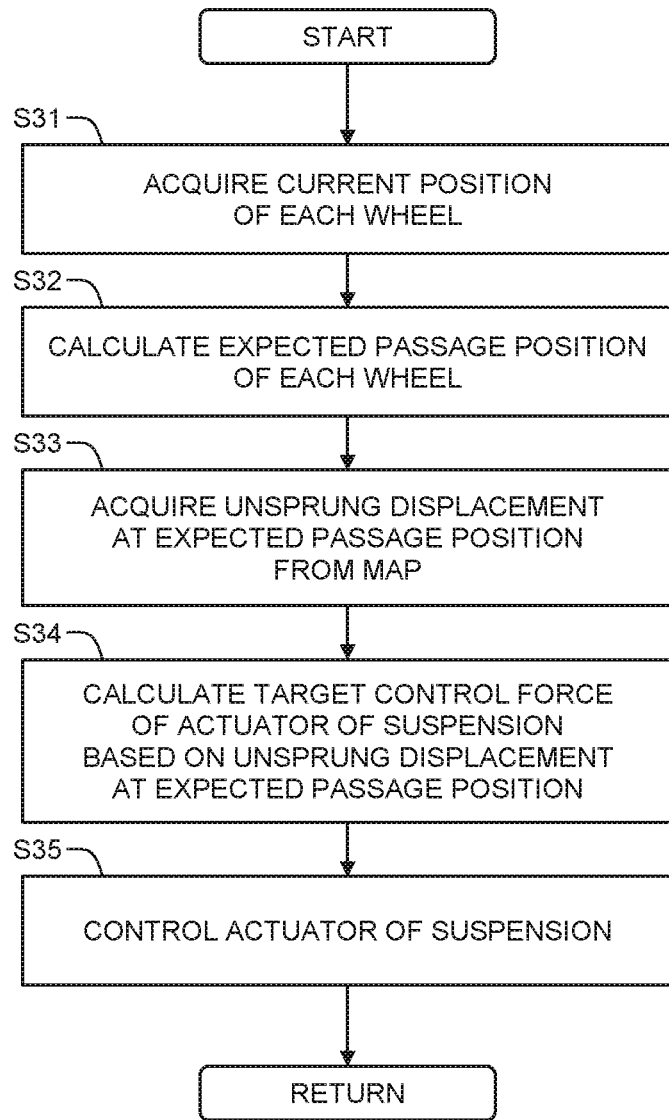
FIG. 10 is a flow chart showing preview control utilizing an unsprung displacement map according to an embodiment.

FIG. 9 is a conceptual diagram for explaining the preview control. FIG. 10 is a flow chart showing the preview control. The preview control will be described with reference to FIGS. 9 and 10.

In Step S31, the control device 70 acquires a current position P0 of each wheel 2. The relative positional relationship between the reference point of the vehicle position in the vehicle 1 and each wheel 2 is known information. Based on the relative positional relationship and the vehicle position indicated by the position information 94, it is possible to calculate the position of each wheel 2.

In Step S32, the control device 70 calculates an expected passage position Pf of the wheel 2 after a preview time tp. For example, the preview time tp is set to be equal to or more than a time required for computation processing and communication processing required to actuate the actuator 3A of the suspension 3. The preview time tp may be fixed or may be variable depending on a situation. A preview distance Lp is given by a product of the preview time tp and the vehicle speed V. The expected passage position Pf is a position the preview distance Lp ahead of the current position P0. As a modification example, the control device 70 may calculate an expected travel route based on the vehicle speed V and the steering angle of the wheel 2 and then calculate the expected passage position Pf based on the expected travel route.

In Step S33, the control device 70 reads the unsprung displacement Zu at the expected passage position Pf from the unsprung displacement map 200.

In Step S34, the control device 70 calculates a target control force Fc_t of the actuator 3A of the suspension 3 based on the unsprung displacement Zu at the expected passage position Pf. For example, the target control force Fc_t is calculated as follows.

An equation of motion regarding the sprung structure 5 (see FIG. 2) is expressed by the following Equation (1).

[Equation 1]

$$m \cdot Zs'' = C(Zu' - Zs') + K(Zu - Zs) - Fc \quad (1)$$

In Equation (1), m is a mass of the sprung structure 5, C is the damping coefficient of the damper 3D, K is the spring constant of the spring 3S, Fc is the control force Fc in the vertical direction generated by the actuator 3A. When vibration of the sprung structure 5 is completely canceled by the control force Fc (i.e., Zs''=0, Zs'=0, Zs=0), the control force Fc is expressed by the following Equation (2).

[Equation 2]

$$Fc = C \cdot Zu' + K \cdot Zu \quad (2)$$

The control force Fc that at least brings about the vibration suppression effect is expressed by the following Equation (3).

[Equation 3]

$$Fc = \alpha \cdot C \cdot Zu' + \beta \cdot K \cdot Zu \quad (3)$$

In Equation (3), a gain α is greater than 0 and equal to or less than 1, and a gain β also is greater than 0 and equal to or less than 1. When the derivative term in Equation (3) is omitted, the control force Fc that at least brings about the vibration suppression effect is expressed by the following Equation (4).

[Equation 4]

$$Fc = \beta \cdot K \cdot Zu \quad (4)$$

The control device 70 calculates the target control force Fc_t in accordance with the above-described Equation (3) or Equation (4). That is, the control device 70 calculates the target control force Fc_t by substituting the unsprung displacement Zu (second unsprung displacement Zu2) at the expected passage position Pf into Equation (3) or Equation (4).

In Step S35, the control device 70 controls the actuator 3A to generate the target control force Fc_t at a timing when the wheel 2 passes the expected passage position Pf. The timing at which the wheel 2 passes the expected passage position Pf can be recognized from the preview time tp.

The preview control utilizing the unsprung displacement map 200 described above makes it possible to effectively suppress the vibration of the vehicle 1 (the sprung structure 5).

5. Unsprung Displacement Map Considering Vehicle Traveling Direction

Next, a "vehicle traveling direction φ" which is a direction of travel of the vehicle 1 (the wheel 2) is considered. Even when the wheel 2 passes a same position (X, Y) on the road, the unsprung displacement Zu to be calculated may be different depending on the vehicle traveling direction φ. For example, let us consider a case where there is a rut (track) on the road. Depending on whether the wheel 2 moves along the rut or the wheel 2 crosses the rut, the effect of the filtering process may vary and thus the unsprung displacement Zu to be calculated may be different.

For example, when the unsprung displacement map 200 is generated based on the information for map updating that is acquired at the time when the wheel 2 moves along the rut, the influence of the rut may not be well reflected in the unsprung displacement map 200. After that, when the preview control is performed based on that unsprung displacement map 200 when the wheel 2 crosses the rut at the same position, the effect of the vehicle control may not be obtained as expected. Conversely, when the unsprung displacement map 200 is generated based on the information for map updating that is acquired at the time when the wheel 2 crosses the rut, the influence of the rut is greatly reflected in the unsprung displacement map 200. After that, when the preview control is performed based on the unsprung displacement map 200 when the wheel 2 moves along the rut at the same position, it is erroneously recognized that there is a step due to the rut.

As described above, when the vehicle traveling direction φ at the time of the vehicle control is greatly different from that at the time of the map generation even at the same position (X, Y), the effect of the vehicle control may not be obtained as expected. In view of the above, the present embodiment further provides the map data in which the vehicle traveling direction φ is taken into consideration.

5-1. Data Structure of Unsprung Displacement Map

Figure 11:
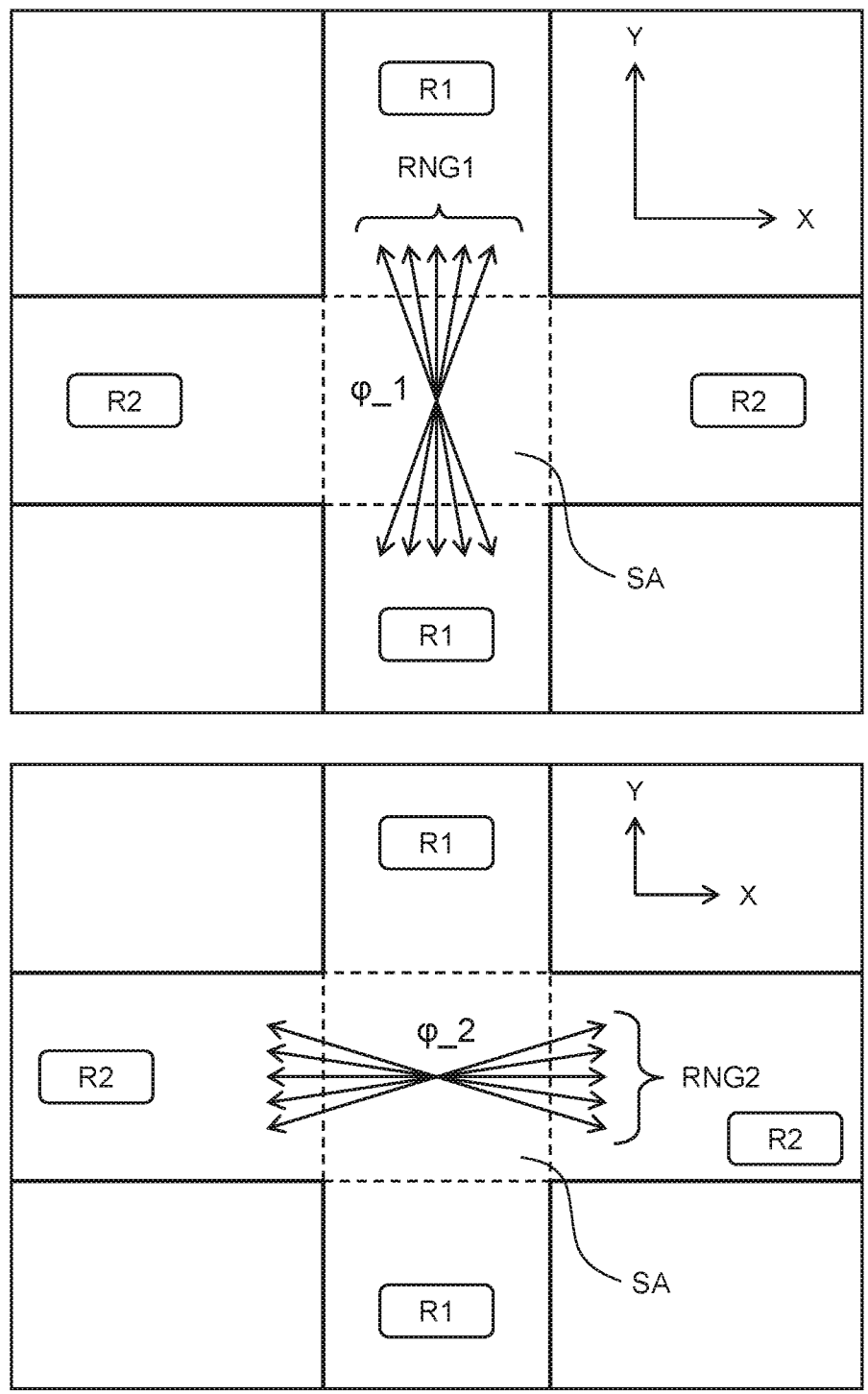
FIG. 11 is a schematic diagram for explaining a vehicle traveling direction.

FIG. 11 shows the vehicle traveling direction φ at a certain intersection as an example. At the intersection, a first road R1 and a second road R2 intersect with each other.

A first vehicle traveling direction φ_1 is the vehicle traveling direction φ when the vehicle 1 passes through the intersection along the first road R1. The first vehicle traveling direction φ_1 is included in a first direction range RNG1. The first direction range RNG1 includes a direction along the first road R1. On the other hand, a second vehicle traveling direction φ_2 is the vehicle traveling direction φ when the vehicle 1 passes through the intersection along the second road R2. The second vehicle traveling direction φ_2 is included in a second direction range RNG2. The second direction range RNG2 includes a direction along the second road R2.

As shown in FIG. 11, the first direction range RNG1 and the second direction range RNG2 do not overlap each other and can be distinguished from each other. That is, the first vehicle traveling direction φ_1 and the second vehicle traveling direction φ_2 can be distinguished from each other.

Such an area in which a plurality of distinguishable vehicle traveling directions φ can be defined is hereinafter referred to as a "specific area SA." An example of the specific area SA is an intersection as illustrated in FIG. 11. It should be noted that a shape of the intersection is not limited to that shown in FIG. 11. The intersection may have any shape such as a three way intersection, a five way intersection, and the like.

In addition, the vehicle traveling direction φ in a case where a lane change is performed is clearly different from that in a case where the vehicle travels along a lane, and the two vehicle traveling directions φ can be distinguished from each other. Therefore, a road having two lanes on one side can also be the specific area SA. An area where lanes merge or branch can also be the specific area SA. In any case, it is possible to define a plurality of distinguishable vehicle traveling directions φ in the specific area SA.

FIG. 12 is a conceptual diagram for explaining an example of the unsprung displacement map 200 for the specific area SA. A data structure of the unsprung displacement map 200 for the specific area SA includes first layer map data 200-1 and second layer map data 200-2. The first layer map data 200-1 indicates a correspondence relationship between the position (X, Y), the first vehicle traveling direction φ_1, and the unsprung displacement Zu. On the other hand, the second layer map data 200-2 indicates a correspondence relationship between the position (X, Y), the second vehicle traveling direction φ_2, and the unsprung displacement Zu. That is, the unsprung displacement map 200 for the specific area SA is multi-layered.

As shown in FIG. 7 described above, a road area may be segmented in a mesh pattern on the horizontal plane. That is, the road area may be segmented into a plurality of unit areas M on the horizontal plane. A unit area M is, for example, a square. The square has a side length of, for example, 10 cm. Each layer map data 200-i (i=1, 2) indicates a correspondence relationship between the position (X, Y) of the unit area M, the vehicle traveling direction φ_i in the unit area M, and the unsprung displacement Zu in the unit area M. The position (X, Y) of the unit area M may be defined by a representative position (e.g., a center position) of the unit area M, or may be defined by a horizontal range (a latitude range and a longitude range) of the unit area M. The vehicle traveling direction φ_i in the unit area M may be defined by a representative value (e.g., an average value) of the vehicle traveling directions φ_i in the unit area M, or may be defined by a range of the vehicle traveling direction φ_i in the unit area M. The unsprung displacement Zu in the unit area M is, for example, an average value of the unsprung displacements Zu acquired within the unit area M. The smaller the unit area M is, the higher a resolution of the layer map data 200-i is.

FIG. 13 is a conceptual diagram for explaining another example of the unsprung displacement map 200 for the specific area SA. The first vehicle traveling directions φ_1 in the first layer map data 200-1 are collectively expressed as a first direction range RNG1. Similarly, the second vehicle traveling directions φ_2 in the second layer map data 200-2 are collectively expressed as a second direction range RNG2. Bringing the vehicle traveling directions φ together makes it possible to reduce the data amount of the unsprung displacement map 200.

FIG. 14 is a conceptual diagram for explaining an example of the unsprung displacement map 200 for an area other than the specific area SA. A data structure of the unsprung displacement map 200 for the area other than the specific area SA includes only a single piece of layer map data 200-0. The layer map data 200-0 indicates a correspondence relationship between the position (X, Y), the vehicle traveling direction φ, and the unsprung displacement Zu. Since only the single piece of layer map data 200-0 is prepared for the area other than the specific area SA, the data amount is reduced.

As a modification example, the information of the vehicle traveling direction φ may be omitted from the layer map data 200-0 for the area other than the specific area SA. This makes it possible to further reduce the data amount of the unsprung displacement map 200.

5-2. Map Generating/Updating Process

Next, the map generating/updating process considering the vehicle traveling direction φ will be described. As shown in FIG. 8 described above, in Step S100, the processor 120 of the map management system 100 acquires the information for map updating from the vehicle 1 (i.e., the vehicle control system 10). The information for map updating includes the position information 94 indicating the position (X, Y) and the vehicle traveling direction φ of the vehicle 1. The vehicle traveling direction φ is one at the time when the information for map updating is obtained. In addition, the information for map updating includes information (e.g., the wheel position, the sensor-based information, the unsprung displacement Zu, and the like) necessary for updating the unsprung displacement map 200. In Step S200 after Step S100, the processor 120 generates/updates the unsprung displacement map 200 based on the information for map updating.

Figure 15:
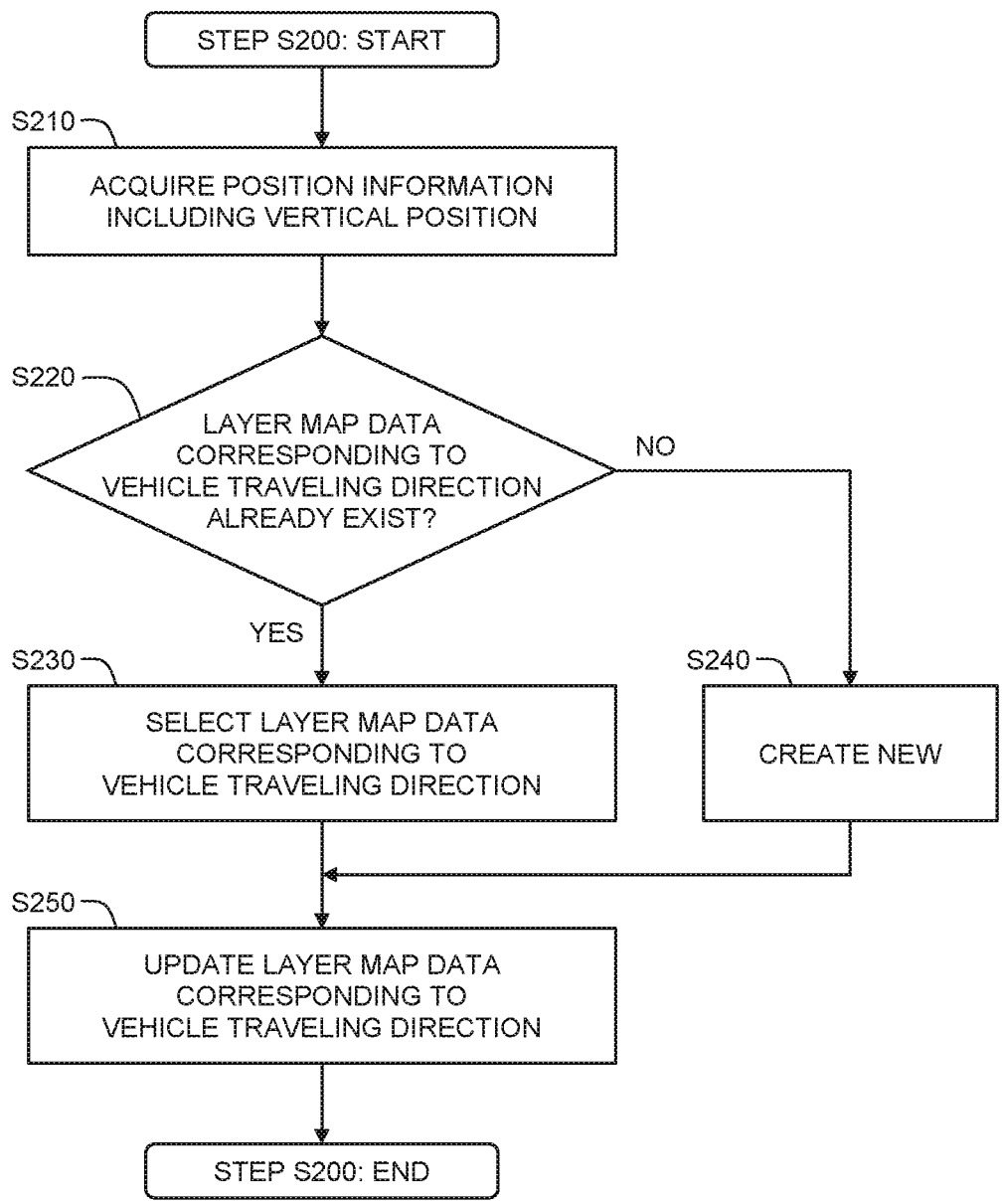
FIG. 15 is a flow chart showing a map generating/updating process for a specific area.

FIG. 15 is a flow chart showing an example of Step S200 for the specific area SA.

In Step S210, the processor 120 acquires the position information 94 including the vehicle traveling direction φ from the information for map updating. That is, the processor 120 acquires the vehicle traveling direction φ at the time when the information for map updating is generated.

In Step S220, the processor 120 determines whether or not layer map data 200-j (j=1 or 2) corresponding to the vehicle traveling direction φ already exist in the unsprung displacement map 200. This determination is possible by comparing the vehicle traveling direction φ and the vehicle traveling direction φ_k included in the layer map data 200-k already registered in the unsprung displacement map 200. Here, the comparison between the vehicle traveling directions φ may be made in consideration of a certain error range (e.g., ±20 degrees). When the layer map data 200-j corresponding to the vehicle traveling direction φ already exist in the unsprung displacement map 200 (Step S220; Yes), the processing proceeds to Step S230. Otherwise (Step S220; No), the processing proceeds to Step S240.

In Step S230, the processor 120 selects the existing layer map data 200-j corresponding to the vehicle traveling direction φ.

In Step S240, the processor 120 newly creates a layer map data 200-j corresponding to the vehicle traveling direction φ.

In Step S250, the processor 120 updates the layer map data 200-*j* corresponding to the vehicle traveling direction φ based on the information for map updating.

5-3. Vehicle Control Process

Figure 16:
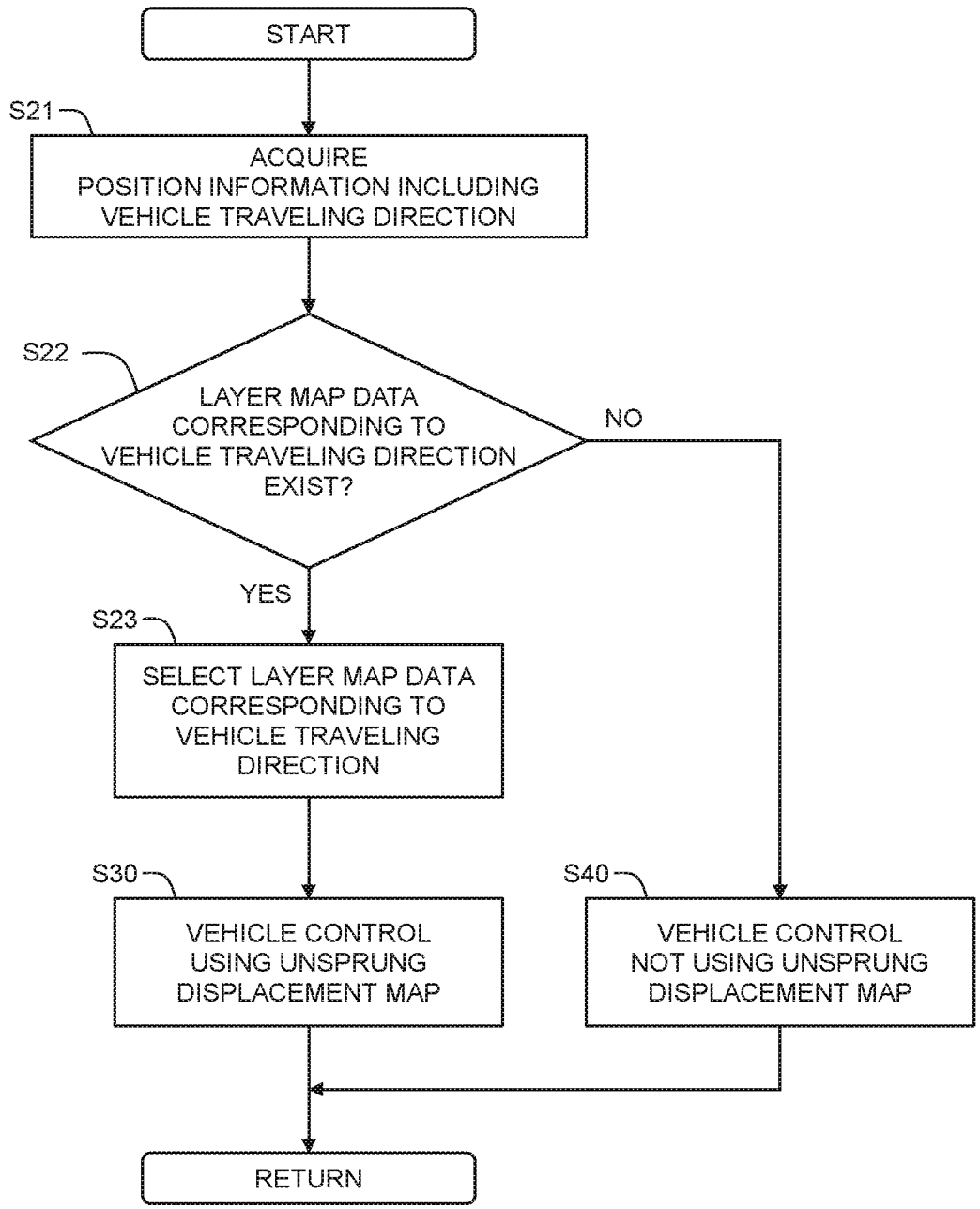
FIG. 16 is a flow chart showing a vehicle control process in a specific area.

FIG. 16 is a flow chart showing a vehicle control process in the specific area SA. For convenience sake, the vehicle 1 as a target of the vehicle control process is hereinafter referred to as a "target vehicle 1T."

In Step S21, the control device 70 of the vehicle control system 10 acquires the position information 94. The position information 94 includes the position (X, Y) and the vehicle traveling direction φ of the target vehicle 1T.

In Step S22, the control device 70 determines whether or not layer map data 200-*j* (j=1 or 2) corresponding to the vehicle traveling direction φ of the target vehicle 1T already exist in the unsprung displacement map 200. This determination is possible by comparing the vehicle traveling direction φ of the target vehicle 1T and the vehicle traveling direction φ_k included in the layer map data 200-*k* already registered in the unsprung displacement map 200. Here, the comparison between the vehicle traveling directions φ may be made in consideration of a certain error range (e.g., ±20 degrees). When the layer map data 200-*j* corresponding to the vehicle traveling direction φ of the target vehicle 1T already exist in the unsprung displacement map 200 (Step S22; Yes), the processing proceeds to Step S23. Otherwise (Step S22; No), the processing proceeds to Step S40.

In Step S23, the control device 70 selects the existing layer map data 200-*j* corresponding to the vehicle traveling direction φ of the target vehicle 1T. After that, the processing proceeds to Step S30.

In Step S30, the control device 70 performs vehicle control utilizing the unsprung displacement map 200. More specifically, the control device 70 acquires the unsprung displacement Zu from the layer map data 200-*j* selected in Step S23. Then, the control device 70 performs the vehicle control of the target vehicle 1T based on the acquired unsprung displacement Zu. For example, the vehicle control is the preview control (see FIGS. 9 and 10). Since the unsprung displacement Zu corresponding to the vehicle traveling direction φ is correctly obtained, it is possible to appropriately perform the vehicle control.

In Step S40, the control device 70 performs vehicle control that does not utilize the unsprung displacement map 200. For example, the control device 70 performs well-known vibration suppression control based on feedback control. A gain of the well-known vibration suppression control may be set to be larger than usual.

5-4. Effects

As described above, according to the present embodiment, the unsprung displacement map 200 in which the vehicle traveling direction φ is considered is provided.

Moreover, the vehicle control in the specific area SA is performed by utilizing the unsprung displacement map 200 according to the present embodiment. Since the unsprung displacement Zu corresponding to the vehicle traveling direction φ is correctly obtained, it is possible to appropriately perform the vehicle control.

Furthermore, by making only the unsprung displacement map 200 for the specific area SA multi-layered, it is possible to suppress the data amount of the unsprung displacement map 200.

5-5. Modification Example

5-5-1. First Modification Example

FIG. 17 is a conceptual diagram for explaining a first modification of the unsprung displacement map 200 for the specific area SA. The data structure of the unsprung displacement map 200 for the specific area SA may include only one of the first layer map data 200-1 and the second layer map data 200-2 and may not include the other.

As an example, consider a case where, in the specific area SA, a representative value of the unsprung displacement Zu in the case of the second vehicle traveling direction φ_2 is greater than a representative value of the unsprung displacement Zu in the case of the first vehicle traveling direction φ_1. Examples of the representative value include an average value, a maximum value, and the like. A greater vibration suppression effect is expected in the case of the second vehicle traveling direction φ_2 where the unsprung displacement Zu is greater. Therefore, the second layer map data 200-2 may take a priority. That is, as shown in FIG. 17, the data structure of the unsprung displacement map 200 for the specific area SA may include only the second layer map data 200-2 without including the first layer map data 200-1. This makes it possible to further reduce the data amount of the unsprung displacement map 200.

As another example, when the number of travel in the second vehicle traveling direction φ_2 is larger than the number of travel in the first vehicle traveling direction φ_1 in the specific area SA, the second layer map data 200-2 may take a priority. That is, the data structure of the unsprung displacement map 200 for the specific area SA may include only the second layer map data 200-2 without including the first layer map data 200-1. This makes it possible to further reduce the data amount of the unsprung displacement map 200.

5-5-2. Second Modification Example

In a second modification example, the unsprung displacement map 200 for the specific area SA has a "specific area flag" instead of the information of the vehicle traveling direction φ and the unsprung displacement Zu. When the specific area flag is read out from the unsprung displacement map 200, the vehicle control using the unsprung displacement map 200 is not performed. Instead, vehicle control not using the unsprung displacement map 200 may be performed (Step S40).

What is claimed is:

1. A non-transitory computer-readable recording medium on which map data regarding a vertical motion parameter related to a vertical motion of a wheel of a vehicle are recorded, the map data comprising a data structure for a specific area, wherein the data structure for the specific area includes:

first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter.

2. The non-transitory computer-readable recording medium according to claim 1, wherein the map data further comprises another data structure for an area other than the specific area, and said another data structure for the area other than the specific area includes a single piece of layer map data indicating at least a correspondence relationship between a position and the vertical motion parameter.

3. The non-transitory computer-readable recording medium according to claim 1, wherein the specific area is an intersection at which a first road and a second road intersect with each other, the first direction range includes a direction along the first road, and the second direction range includes a direction along the second road.

4. The non-transitory computer-readable recording medium according to claim 1, wherein vehicle control of a target vehicle is performed based on the vertical motion parameter acquired from the map data.

5. The non-transitory computer-readable recording medium according to claim 4, wherein when the vehicle control of the target vehicle is performed in the specific area, whether or not layer map data corresponding to a vehicle traveling direction of the target vehicle exist in the map data is determined, and when the layer map data corresponding to the vehicle traveling direction of the target vehicle exist, the vertical motion parameter is acquired from the layer map data corresponding to the vehicle traveling direction of the target vehicle.

6. A map updating method for updating map data regarding a vertical motion parameter related to a vertical motion of a wheel of a vehicle, the map updating method comprising updating the map data based on time-series data of a wheel position and time-series data of the vertical motion parameter, wherein the map data have a data structure for a specific area, the data structure for the specific area includes at least one of:

first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter, and the updating the map data includes:

acquiring a vehicle traveling direction at a time when the time-series data of the wheel position are acquired;

determining whether or not layer map data corresponding to the vehicle traveling direction exist in the map data; and when the layer map data corresponding to the vehicle traveling direction exist, selecting and updating the layer map data corresponding to the vehicle traveling direction.

7. A vehicle control method comprising:

acquiring map data regarding a vertical motion parameter related to a vertical motion of a wheel of a vehicle; and controlling a target vehicle based on the vertical motion parameter acquired from the map data, wherein the map data have a data structure for a specific area, the data structure for the specific area includes at least one of:

first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter, and the controlling the target vehicle in the specific area includes:

determining whether or not layer map data corresponding to a vehicle traveling direction of the target vehicle exist in the map data; and when the layer map data corresponding to the vehicle traveling direction of the target vehicle exist, acquiring the vertical motion parameter from the layer map data corresponding to the vehicle traveling direction of the target vehicle.

8. A vehicle control system comprising one or more processors configured to execute:

acquiring map data regarding a vertical motion parameter related to a vertical motion of a wheel of a vehicle; and controlling a target vehicle based on the vertical motion parameter acquired from the map data, wherein the map data have a data structure for a specific area, the data structure for the specific area includes at least one of:

first layer map data indicating a correspondence relationship between a first vehicle traveling direction included in a first direction range, a position, and the vertical motion parameter; and second layer map data indicating a correspondence relationship between a second vehicle traveling direction included in a second direction range not overlapping the first direction range, a position, and the vertical motion parameter, and the controlling the target vehicle in the specific area includes:

determining whether or not layer map data corresponding to a vehicle traveling direction of the target vehicle exist in the map data; and when the layer map data corresponding to the vehicle traveling direction of the target vehicle exist, acquiring the vertical motion parameter from the layer map data corresponding to the vehicle traveling direction of the target vehicle.

* * * * *